US009529232B2

(12) United States Patent
Guo et al.

(10) Patent No.: US 9,529,232 B2
(45) Date of Patent: Dec. 27, 2016

(54) LIQUID DISPLAY PANEL AND PROCESS FOR PREPARING SAME

(71) Applicant: BEIJING BOE OPTOELECTRONICS TECHNOLOGY CO., LTD., Beijing (CN)

(72) Inventors: Renwei Guo, Beijing (CN); Dong Chen, Beijing (CN); Xue Dong, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 433 days.

(21) Appl. No.: 13/704,778

(22) PCT Filed: Oct. 22, 2012

(86) PCT No.: PCT/CN2012/083327
§ 371 (c)(1),
(2) Date: Dec. 17, 2012

(87) PCT Pub. No.: WO2013/078924
PCT Pub. Date: Jun. 6, 2013

(65) Prior Publication Data
US 2014/0078455 A1 Mar. 20, 2014

(30) Foreign Application Priority Data
Nov. 29, 2011 (CN) .......................... 2011 1 0388315

(51) Int. Cl.
*G02F 1/1337* (2006.01)
*C08F 2/48* (2006.01)
(Continued)

(52) U.S. Cl.
CPC ........... *G02F 1/133788* (2013.01); *C08F 2/48* (2013.01); *C08F 230/08* (2013.01);
(Continued)

(58) Field of Classification Search
CPC .................... G02F 1/133788; G02F 1/133711; B29D 11/00; C08F 2/48; C08F 230/08; C08F 222/1006
See application file for complete search history.

(56) References Cited

U.S. PATENT DOCUMENTS 6,300,454 B1 * 10/2001 Hanelt et al. ................... 528/27
2003/0104145 A1 * 6/2003 Ogawa et al. ............... 428/1.23
(Continued)

FOREIGN PATENT DOCUMENTS

CN      1272184 A      11/2000
CN      101566755 A    10/2009
(Continued)

OTHER PUBLICATIONS

International Search Report mailed Jan. 31, 2013; PCT/CN2012/083327.
(Continued)

*Primary Examiner* — Mathieu Vargot
(74) *Attorney, Agent, or Firm* — Ladas & Parry LLP

(57) ABSTRACT

Embodiments of the invention provide a liquid display panel and a process for preparing the same comprising: coating a polymerizable siloxane solution onto either of an array substrate and a color filter substrate; applying a mixture comprising a liquid crystalline polymerizable monomer, a photoinitiator, and liquid crystal between the color filter substrate and the array substrate; and allowing the liquid crystalline polymerizable monomer and the polymerizable siloxane to polymerize under effect of the photoinitiator with UV irradiation to generate a network of high molecular (Continued)

polymers, thereby anchoring liquid crystal molecules in the liquid crystal to a state of vertical orientation. The liquid display panel effectively increases the uniformity of the arrangement of the long axes of the liquid crystal molecules vertical to the array substrate, reduces the deviation of arrangement in the vertical direction among the liquid crystal molecules at different positions of the liquid display panel, and improves display performance of the liquid display panel.

5 Claims, 3 Drawing Sheets

(51) Int. Cl.
*C08F 230/08* (2006.01)
*G02F 1/137* (2006.01)
*C08F 222/10* (2006.01)

(52) U.S. Cl.
CPC .. *G02F 1/133711* (2013.01); *C08F 222/1006* (2013.01); *G02F 2001/13775* (2013.01); *G02F 2001/133715* (2013.01)

(56) References Cited

U.S. PATENT DOCUMENTS

| 2006/0204680 | A1 | 9/2006 | Hattori et al. |
| 2011/0037026 | A1* | 2/2011 | Lee ........................ C09K 19/54 252/299.63 |
| 2011/0157538 | A1* | 6/2011 | Lee ................... G02F 1/133351 349/190 |
| 2014/0078455 | A1 | 3/2014 | Guo et al. |

FOREIGN PATENT DOCUMENTS

| CN | 101687996 A | 3/2010 |
| CN | 102643387 A | 8/2012 |
| JP | 63-106626 A | 5/1988 |

OTHER PUBLICATIONS

First Chinese Office Action dated Jul. 30, 2013; Appln. No. 201110388315.4.
Second Chinese Office Action dated Mar. 12, 2014; Appln. No. 201110388315.4.
International Preliminary Report on Patentability dated Jun. 3, 2014; PCT/CN2012/083327.

* cited by examiner

LIQUID DISPLAY PANEL AND PROCESS FOR PREPARING SAME

TECHNICAL FIELD

Embodiments of the present invention relate to a liquid display panel and a process for preparing the same.

BACKGROUND

With the gradual popularization of the personal computer, the liquid display technique enjoys a rapid development. Wide visual angle, low energy cost and rapid speed of response become important parameters of the liquid crystal display appliances. Among the factors determining the speed of response of a liquid crystal, in addition to the property of the crystal molecule itself, one important external factor is its orientation on the array panel. By selecting a suitable alignment film material and orientation technique to optimize the arrangement and the pretilt angle of the liquid molecule on the array substrate, the speed of response of the liquid display panel can be improved, and the visual angle of the liquid crystal display can be expanded.

Currently, depending on different types of liquid display panels, there are different modes for realizing orientation of liquid crystal. There are two common modes of orientation of liquid crystal. One is the parallel orientation mode of liquid crystal, in which an alignment film material polyimide (PI) is coated onto the surface of an array substrate to form an alignment film, followed by generation of narrow scratches on the alignment film by rubbing to induce the long axis of the liquid crystal molecules to arrange parallel to the array substrate. The other is the vertical orientation mode of liquid crystal; in this mode of orientation, siloxane is used as a vertical alignment film material, and the surface of the array substrate is treated to allow the siloxane adhere to the substrate through chemical linkages, wherein the terminal flexible chain group of the siloxane can induce the long axis of the liquid crystal molecules to arrange vertical to the substrate. At the positions close to the siloxane, the liquid crystal molecules are subject to a great orientation effect, and the long axis of the liquid crystal can be arranged vertical to the array substrate. However, at the positions farther from the siloxane, the liquid crystal molecules are subject to a limited orientation effect and the orientation is primarily subject to the induction of the oriented crystal liquid molecules. This causes deviations in the vertical direction among the liquid crystal molecules at different positions within the liquid display panel, resulting in non-uniformity of the arrangement of the entire crystal liquid in the vertical direction, which causes light scattering when light passes through the whole liquid crystal panel, thereby affecting display performance of the liquid display panel.

SUMMARY

Embodiments of the invention provide a liquid display panel and a process for preparing the same, so as to solve the following problem: a vertical orientation material cannot effectively induce liquid crystal molecules, resulting in deviation of arrangement in a vertical direction among liquid crystal molecules at different positions of a liquid display panel, which affects display performance of the liquid display panel.

An embodiment of the invention provides a process for preparing a liquid display panel comprising:

coating a polymerizable siloxane solution onto either of an array substrate and a color filter substrate;

applying a mixture comprising a liquid crystalline polymerizable monomer, a photoinitiator, and liquid crystal between the color filter substrate and the array substrate; and allowing the liquid crystalline polymerizable monomer and the polymerizable siloxane to polymerize under effect of the photoinitiator with UV irradiation to generate a network of high molecular polymers, thereby anchoring liquid crystal molecules in the liquid crystal to a state of vertical orientation.

An embodiment of the invention provides a liquid display panel comprising a color filter substrate, an array substrate, and a liquid crystal and a network of high molecular polymers filled between the color filter substrate and the array substrate;

wherein the network of high molecular polymers are generated by polymerization of the liquid crystalline polymerizable monomer and the polymerizable siloxane under effect of a photoinitiator with UV irradiation, for anchoring liquid crystal molecules in the liquid crystal to a state of vertical orientation.

Embodiments of the invention provide a liquid display panel and a process for preparing the same, comprising: coating a polymerizable siloxane solution onto either of an array substrate and a color filter substrate; applying a mixture comprising a liquid crystalline polymerizable monomer, a photoinitiator, and liquid crystal between the color filter substrate and the array substrate; and allowing the liquid crystalline polymerizable monomer and the polymerizable siloxane to polymerize under effect of the photoinitiator with UV irradiation to generate a network of high molecular polymers, thereby anchoring liquid crystal molecules in the liquid crystal to a state of vertical orientation. The liquid display panel thus obtained comprises a network of high molecular polymers generated by polymerization of the liquid crystalline polymerizable monomer and the polymerizable siloxane under effect of a photoinitiator with UV irradiation, wherein the liquid crystal molecules surrounding the network of high molecular polymer are subject to anchoring effect of the network and arranged with the long axes of the liquid crystal molecules vertical to the array substrate, which effectively increases the uniformity of the arrangement of the long axes of the liquid crystal molecules vertical to the array substrate, reduces the deviation of arrangement in the vertical direction among the liquid crystal molecules at different positions of the liquid display panel, and improves display performance of the liquid display panel.

BRIEF DESCRIPTION OF THE DRAWINGS

In order to more clearly illustrate the technical solutions of the embodiments of the invention, the figures of the embodiments will be briefly introduced below. Apparently, the figures described below merely involve some embodiments of the invention, rather than limiting the invention.

DETAILED DESCRIPTION

In order to make the object, technical solutions and advantages of the embodiments of the invention more clear, the technical solutions of the embodiments of the invention are clearly and completely described below in light of the figures of the embodiments of the invention. Apparently, the embodiments described are a subset of the embodiments of the invention, rather than all embodiments. Any other embodiments obtained by a person of ordinary skill in the art based on the embodiments of the invention described, without resorting to creative labor, fall into the scope of protection of the present invention.

Figure 1:
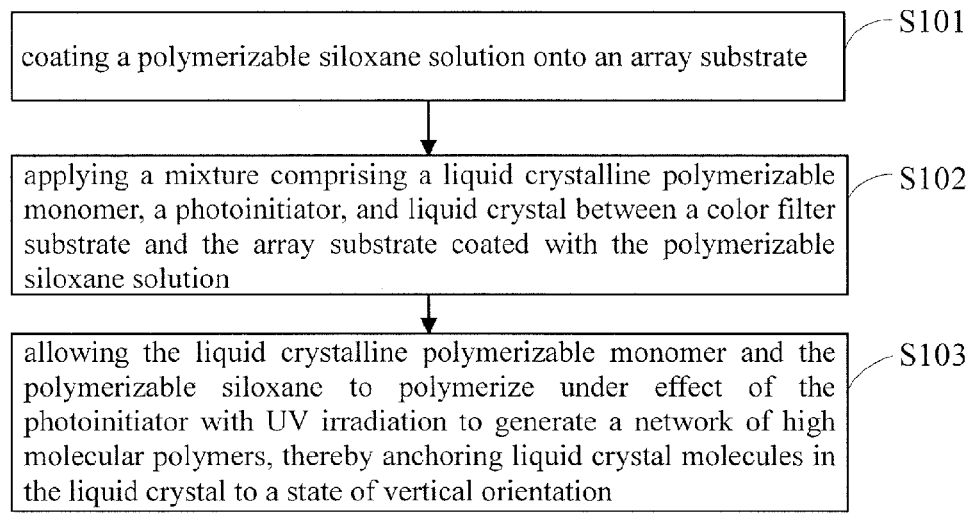
FIG. 1 shows one flow chart for preparing a liquid display panel provided in an embodiment of the invention.

An embodiment of the invention provides a process for preparing a liquid display panel, which, as shown in FIG. 1, comprises the following steps.

Step S101: coating a polymerizable siloxane solution onto an array substrate.

Step S102: applying a mixture comprising a liquid crystalline polymerizable monomer, a photoinitiator, and liquid crystal between a color filter substrate and the array substrate coated with the polymerizable siloxane solution.

Step S103: allowing the liquid crystalline polymerizable monomer and the polymerizable siloxane to polymerize under effect of the photoinitiator with UV irradiation to generate a network of high molecular polymers, thereby anchoring liquid crystal molecules in the liquid crystal to a state of vertical orientation.

For example, the aforementioned Step S101 of coating a polymerizable siloxane solution onto an array substrate can be implemented in the following ways.

For example, polymerizable siloxane is dissolved at a certain ratio into water or an organic solvent to produce a mixed solution; then, the solution of the polymerizable siloxane is coated onto the array substrate. For example, when the concentration of the solution of the polymerizable siloxane is between 1%~5%, a solution having a relatively good solubility can be obtained.

Similarly, the polymerizable siloxane solution can also be first coated onto a color filter substrate, and then a mixture comprising a liquid crystalline polymerizable monomer, a photoinitiator, and liquid crystal between an array substrate and the color filter substrate coated with the polymerizable siloxane solution.

Figure 2:
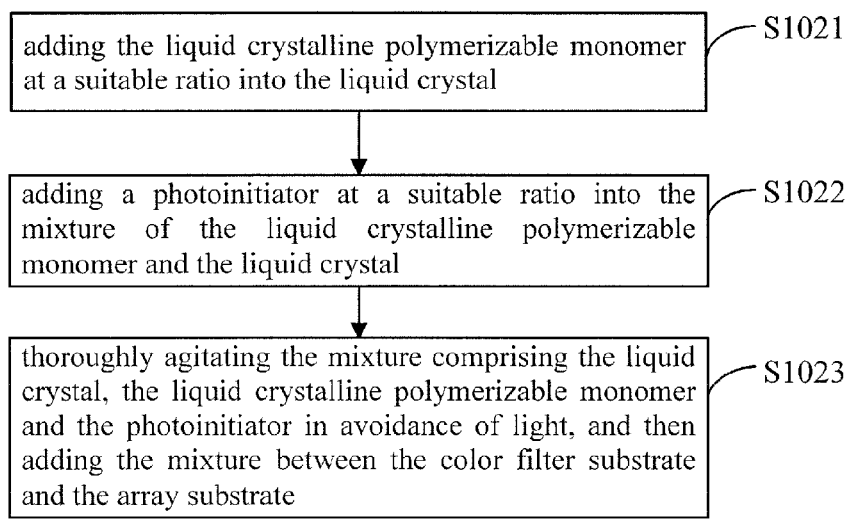
FIG. 2 shows another flow chart for preparing a liquid display panel provided in an embodiment of the invention.

Fore example, the aforementioned Step S102 of applying a mixture comprising a liquid crystalline polymerizable monomer, a photoinitiator, and liquid crystal between a color filter substrate and the array substrate coated with the polymerizable siloxane solution, which, as shown in FIG. 2 can comprise the following steps:

Step S1021: adding the liquid crystalline polymerizable monomer at a suitable ratio into the liquid crystal.

For example, the liquid crystalline polymerizable monomer is C6M, or a derivative of C6M.

The higher the content of the liquid crystalline polymerizable monomer, the denser the meshes of the network of the high molecular polymer generated by the polymerization of the liquid crystalline polymerizable monomer with the polymerizable siloxane after UV irradiation. The lower the content of the liquid crystalline polymerizable monomer, the sparser the meshes of the network of the high molecular polymer generated by the polymerization of the liquid crystalline polymerizable monomer with the polymerizable siloxane after UV irradiation.

For example, when the mass of the liquid crystalline polymerizable monomer accounts for 1%~20% of the total mass of the mixture, the network of the high molecular polymer thus generated has a good orientation inducing effect on the liquid crystal molecules.

Step S1022: adding a photoinitiator at a suitable ratio into the mixture of the liquid crystalline polymerizable monomer and the liquid crystal obtained in Step S1021.

For example, the photoinitiator can be one of benzoyl peroxide, lauroyl peroxide, azobisisobutyronitrile, 2,2'-azobis-(2,4-dimethylvaleronitrile), diisopropyl peroxydicarbonate, and dicyclohexyl peroxydicarbonate, or any combinations thereof.

The content of the photoinitiator should better not be too high. When the mass of the photoinitiator exceeds 20% of the total mass of the mixture of the liquid crystalline polymerizable monomer, the photoinitiator and the liquid crystal, the yellowing phenomenon of the liquid crystal display panel will be incurred, and therefore display performance of the liquid crystal display panel will be adversely affected. When the mass of the photoinitiator accounts for 1%~5% of the total mass of the mixture of the liquid crystalline polymerizable monomer, the photoinitiator and the liquid crystal, the liquid crystal panel thus obtained has good display performance. For example, when the photoinitiator accounts for 1% of the total mass of the mixture, it has even better performance.

Step S1023: thoroughly agitating the mixture comprising the liquid crystal, the liquid crystalline polymerizable monomer and the photoinitiator obtained in Step S1022 in avoidance of light, and then adding the mixture between the color filter substrate and the array substrate.

For example, the aforementioned mixture can be added between the color filter substrate and the array substrate by way of dispensing.

The order of the aforementioned steps S1021 and S1022 may also be alternated. Step S1022 may first be executed, and then Step S1021 is executed. Alternatively, steps S1021 and S1022 are simultaneously executed, that is, the photoinitiator and the liquid crystalline polymerizable monomer are simultaneously added into the liquid crystal. None of the above is limitative.

For example, in the aforementioned Step S103, the liquid crystalline polymerizable monomer and the polymerizable siloxane are initiated by the photoinitiator to form a network of high molecular polymers after UV irradiation. The small liquid crystal molecules around the network of the high molecular polymers are anchored, so that the long axes of the small liquid crystal molecules are arranged vertical to the array substrate (as well as the color filter substrate) under the influence of the initial conditions. Since the network of the high molecular polymers thus formed fills the whole liquid crystal display panel and anchors the small liquid crystal molecules surrounding the network, both the small liquid crystal molecules on the edges and those in the center will be anchored by the network of high molecular polymers. Compared to the prior art in which only siloxane is used to induce the liquid crystal molecules to be arranged vertical to the substrate for the vertical orientation mode, the technology used in this embodiment of anchoring the surrounding liquid crystal molecules by using the network of high molecular polymerizables disposed between the color filter substrate and the array substrate can more effectively increase the uniformity of the arrangement of the axes of the liquid crystal molecules vertical to the array substrate, reduce the deviation in the vertical direction among the liquid crystal molecules at different positions of the liquid display panel, thereby improving display performance of the liquid display panel.

Figure 3:
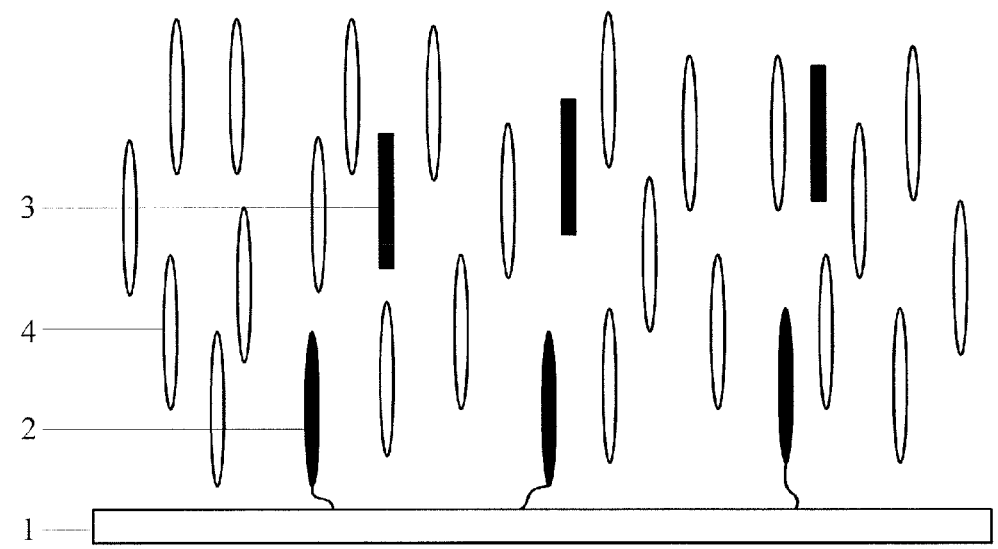
FIG. 3 shows a schematic diagram of a liquid display panel provided in an embodiment of the invention before the polymerization.
Figure 4:
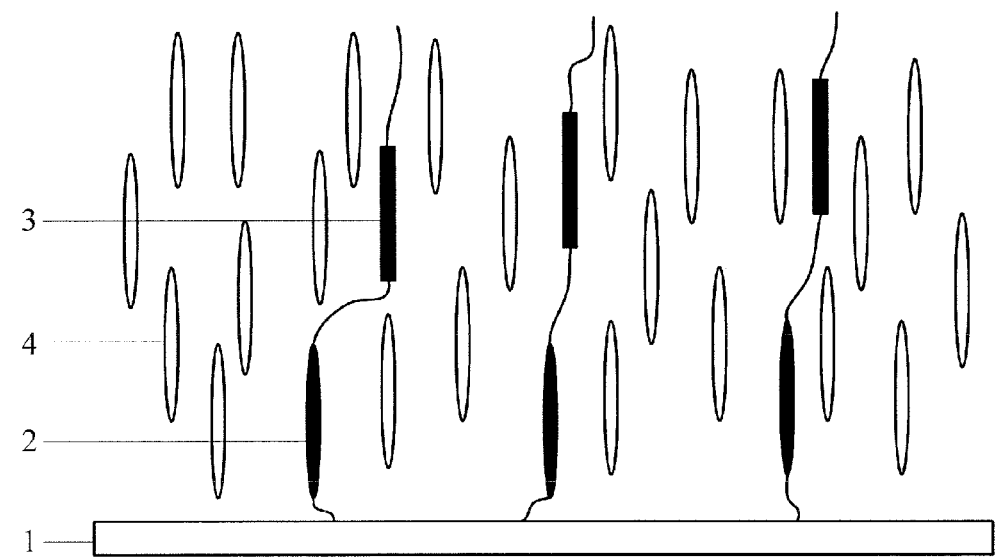
FIG. 4 shows a schematic diagram of a liquid display panel provided in an embodiment of the invention after the polymerization.

During the preparation of the aforementioned liquid crystal display panel provided in an embodiment of the invention, the vertical orientation film material, the polymerizable siloxane, is dissolved at a certain ratio into water or an organic solvent to form a solution, and then the polymerizable siloxane solution is coated onto either of the array substrate and the color filter substrate. The photoinitiator and the liquid crystalline polymerizable monomer are respectively homogenously mixed into liquid crystal at a certain ratio to form a mixture. In the assembly process, the mixture thus obtained is added dropwise between the color filter substrate and the array filter, as shown in FIG. 3. The polymerizable siloxane 2 coated on the array substrate 1 is adhered by chemical linkage to the array substrate 1. The liquid crystalline polymerizable monomer 3 has liquid crystal property itself, thus the liquid crystal molecule 4 and the liquid crystalline polymerizable monomer 3 are subject to the inducive effect of the polymerizable siloxane 2 and arranged vertical to the substrate when not polymerized. After UV irradiation, as shown in FIG. 4, the double bond functional group of the polymerizable siloxane 2 will polymerize with the double bond functional group of the liquid crystalline polymerizable monomer 3 under effect of the photoinitiator (not shown) to form a network of high molecular polymers. During the polymerization, the long axis of the liquid crystal molecule 4 is always arranged vertical to the array substrate. After the polymerization, the network of the high molecular polymers is uniformly distributed between the color filter substrate and the array substrate, which will anchor the surrounding liquid crystal molecules 4. Compared to the prior art, in which only siloxane is used to induce the liquid crystal molecules to be arranged vertical to the substrate for the vertical orientation mode, the technology used in this embodiment of anchoring the surrounding liquid crystal molecules using the network of high molecular polymers disposed between the color filter substrate and the array substrate can more effectively increase the uniformity of the arrangement of the axes of the liquid crystal molecules vertical to the array substrate, reduce the deviation in the vertical direction among the liquid crystal molecules at different positions of the liquid display panel, thereby improving display performance of the liquid display panel.

The aforementioned network of high molecular polymers is formed by the polymerization of the liquid crystalline polymerizable monomer 3 and the polymerizable siloxane 2 under effect of the photoinitiator after UV irradiation. This process is irreversible. Moreover, the formed network of high molecular polymers has a spatial network structure, which is specifically determined by the structures, ratio and positions in the arrangement of the liquid crystalline polymerizable monomer 3 and the polymerizable siloxane 4 before the polymerization.

The difference in the molecular structure of the liquid crystalline polymerizable monomer 3 results in difference in the orientation inducing effect on the liquid crystal molecules 4. For example, the more phenyl rings in the molecule of the liquid crystalline polymerizable monomer 3, the greater the inducive effect on the liquid crystal molecules 4.

Furthermore, the content of the liquid crystalline polymerizable monomer 3 will affect the orientation inducing effect on the liquid crystal molecules 4. Normally, the lower the content of the liquid crystalline polymerizable monomer 3, the sparser the network of the high molecular polymers generated after the polymerization, and the poorer the orientation inducing effect on the liquid crystal molecules 4. The higher the content of the liquid crystalline polymerizable monomer 3, the denser the network of the high molecular polymers generated after the polymerization, and the better the orientation inducing effect on the liquid crystal molecules 4.

For example, in an embodiment of the invention, when the content of the liquid polymerizable monomer 3 is 1%~20% of the liquid crystal content, the network of the high molecular polymers thus formed has better orientation inducing effect on the liquid crystal molecules 4.

Furthermore, differences in the functional groups on the phenyl ring within the molecule of the liquid crystalline polymerizable monomer 3, which leads to difference in molecular polarity, will also affect the orientation inducing effect on the liquid crystal molecules 4.

For example, the liquid crystalline polymerizable monomer 3 may be 1,4-bis(4-(6'-acryloxyhexyloxy)benzoyloxy)-2-toluene (briefly, C6M), having the following molecular structural formula:

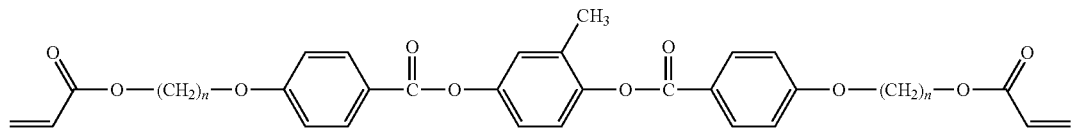

The liquid crystalline polymerizable monomer 3 may also be C6M derivatives having the following molecular structural formulae:

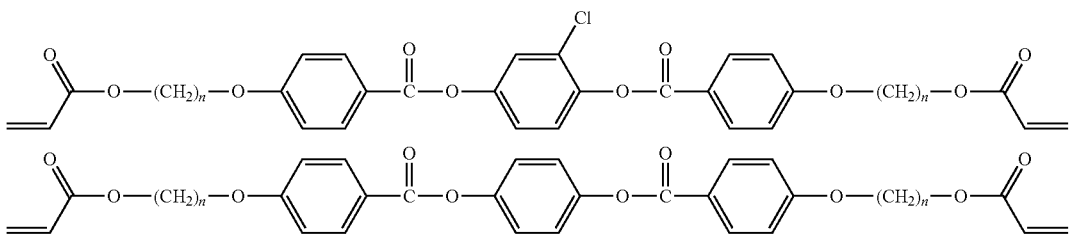

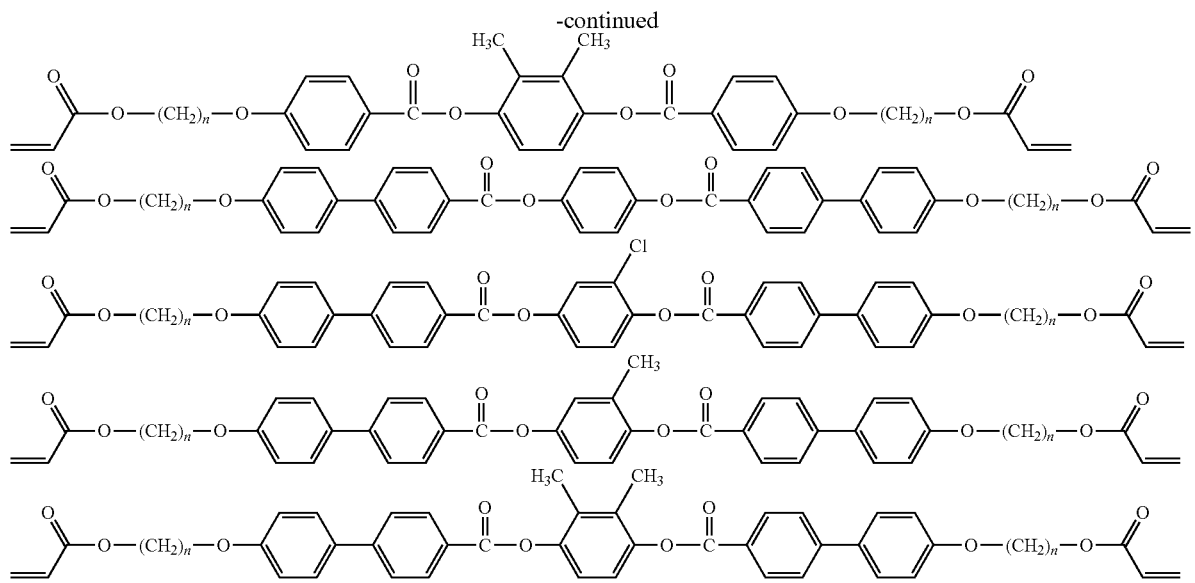

When n=6, the first molecular structural formula represents 1,4-bis(4-(6'-acryloxyhexyloxy)benzoyloxy)-2-chlorobenzene;

the second molecular structural formula represents 1,4-bis(4-(6'-acryloxyhexyloxy)benzoyloxy)-benzene;

the third molecular structural formula represents 1,4-bis(4-(6'-acryloxyhexyloxy)benzoyloxy)-2,3-dimethylbenzene;

the fourth molecular structural formula represents 1,4-bis(4-(6'-acryloxyhexyloxy)dibenzoyloxy)-benzene;

the fifth molecular structural formula represents 1,4-bis(4-(6'-acryloxyhexyloxy)dibenzoyloxy)-2-chlorobenzene;

the sixth molecular structural formula represents 1,4-bis(4-(6'-acryloxyhexyloxy)dibenzoyloxy)-2-toluene; and the seventh molecular structural formula represents 1,4-bis(4-(6'-acryloxyhexyloxy)dibenzoyloxy)-2,3-dimethylbenzene.

When n is another value, the corresponding derivatives of the aforementioned molecular formulae can be obtained. These derivatives can also be used as the liquid crystalline polymerizable monomer 3. Fore example, n can be 2, 4, or 10, etc. Here the specific value of n is not limited.

The varieties of the liquid crystalline polymerizable monomer employed in the embodiments of the invention can become different according to the varieties of the liquid crystal (the structure of the liquid crystal molecule), and is not limited to C6M and derivatives thereof.

The length of the alkyl in the molecule of the polymerizable siloxane 2 will also affect the orientation inducing effect on the liquid crystal molecules 4. Normally, the longer the alkyl of the polymerizable siloxane 2, the better the orientation inducing effect on the liquid crystal molecule 2. The shorter the alkyl of the polymerizable siloxane 2, the poorer the orientation inducing effect on the liquid crystal molecule 2.

For example, the polymerizable siloxane 2 can be an allyloxyethylsiloxane, having the following molecular structural formula:

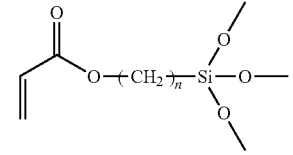

When n=6, the molecular structural formula represents allyloxyhexylsiloxane.

Further, n may also be 2, 4, or 10, etc. Here the specific value of n is not limited.

Figure 5:
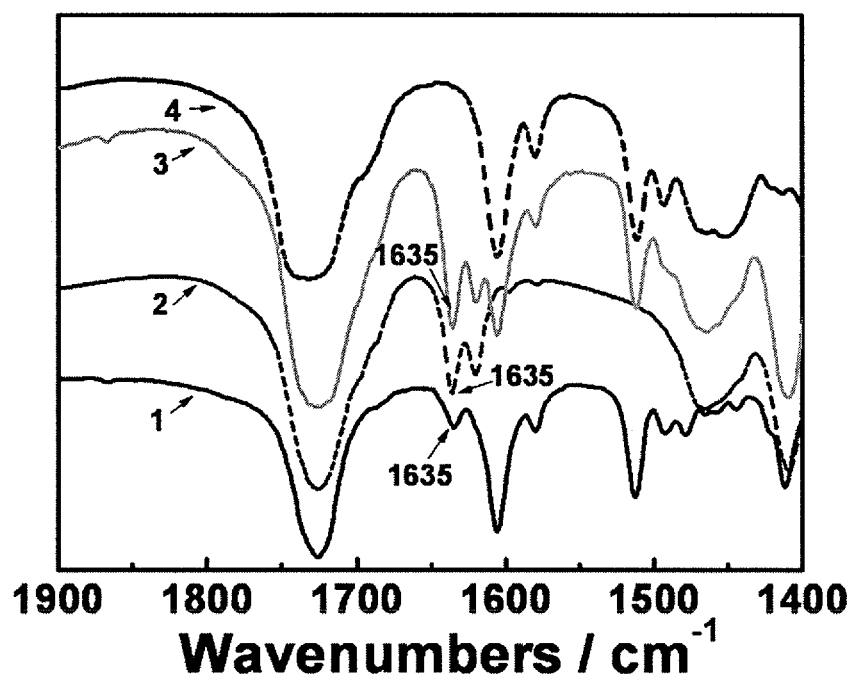
FIG. 5 shows a FT-IR spectrum provided in an embodiment of the invention.

Moreover, for determining whether the network of the high molecular polymers has been formed, the confirmation can be made by the spectrum of the Fourier transformation infrared spectroscopy (FT-IR) shown in FIG. 5. In FIG. 5, Curve 1 is the spectrum of the liquid crystalline polymerizable monomer before polymerization. It can be seen that there exists an absorption peak of double bond functional group at position 1635. Curve 2 is the spectrum of the polymerizable siloxane before polymerization. It can be seen that there exists an absorption peak of double bond functional group at position 1635. Curve 3 is the spectrum of the mixture of the liquid crystalline polymerizable monomer and the polymerizable siloxane, and it can be seen that there exists an absorption peak at position 1635. Curve 4 is the spectrum after the polymerization of the liquid crystalline polymerizable monomer and the polymerizable siloxane, and it can be seen that the absorption peak at position 1635, the characteristic peak of the double bond functional group, disappears. This proves that the liquid crystalline polymerizable monomer and the polymerizable siloxane undergo polymerization reaction to form a network of high molecular polymers.

Another embodiment of the invention also provides a liquid crystal display panel prepared by the aforementioned process of preparing. It specifically comprises a color filter substrate, an array substrate and liquid crystal and a network of high molecular polymers filled between the color filter substrate and the array substrate. The network of high molecular polymers is generated by polymerization of a liquid crystalline polymerizable monomer and a polymerizable siloxane under effect of a photoinitiator with UV irradiation, for anchoring liquid crystal molecules in the liquid crystal to a state of vertical orientation.

In the aforementioned liquid crystal display panel, the liquid crystalline polymerizable monomer may be C6M or C6M derivatives, and its mass accounts for 1%~20% of the total mass of the mixture of the liquid crystalline polymerizable monomer, the photoinitiator and the liquid crystal. The liquid crystal display panel similarly has the aforementioned technical effect, and detailed description is omitted here.

Embodiments of the invention provide a liquid display panel and a process for preparing the same, comprising: coating a polymerizable siloxane solution onto either of an array substrate and a color filter substrate; applying a mixture comprising a liquid crystalline polymerizable monomer, a photoinitiator, and liquid crystal between the color filter substrate and the array substrate; and allowing the liquid crystalline polymerizable monomer and the polymerizable siloxane to polymerize under effect of the photoinitiator with UV irradiation to generate a network of high molecular polymers, thereby anchoring liquid crystal molecules in the liquid crystal to a state of vertical orientation. In an embodiment of the invention, the liquid crystal molecules surrounding the network of high molecular polymers are subject to the anchoring effect of the network and arranged with the long axes of the liquid crystal molecules vertical to the array substrate, which effectively increases the uniformity of the arrangement of the long axes of the liquid crystal molecules vertical to the array substrate, reduces the deviation of arrangement in the vertical direction among the liquid crystal molecules at different positions of the liquid display panel, and improves display performance of the liquid display panel.

The aforementioned embodiments are only exemplary for the invention, but not used to limit the scope of protection of the invention. The scope of protection of the invention is determined by the appended claims.

The invention claimed is:

1. A process for preparing a liquid display panel comprising:
    coating a polymerizable siloxane solution onto an array substrate;
    applying a mixture comprising a liquid crystalline polymerizable monomer, a photoinitiator, and liquid crystal between a color filter substrate and the array substrate coated with the polymerizable siloxane solution; and
    allowing the liquid crystalline polymerizable monomer and the polymerizable siloxane to polymerize under effect of the photoinitiator with UV irradiation to generate a network of high molecular polymers, anchoring liquid crystal molecules in the liquid crystal to a state of vertical orientation;
    wherein a mass of the liquid crystalline polymerizable monomer accounts for 1%~20% of the total mass of the mixture of the liquid crystalline polymerizable monomer, the photoinitiator and the liquid crystal; a mass of the photoinitiator accounts for 1%~5% of the total mass of the mixture of the liquid crystalline polymerizable monomer, the photoinitiator and the liquid crystal; and a mass of the liquid crystal accounts for 75%~98% of the total mass of the mixture of the liquid crystalline polymerizable monomer, the photoinitiator and the liquid crystal; and
    the liquid crystalline polymerizable monomer is C6M or C6M derivatives.

2. The process according to claim 1, wherein coating a polymerizable siloxane solution onto an array substrate specifically comprises:
    dissolving the polymerizable siloxane into water or an organic solvent to provide a solution; and
    coating the solution of the polymerizable siloxane onto either of the array substrate or the color filter substrate.

3. The process according to claim 1, wherein the concentration of the polymerizable siloxane solution is 1%~5%.

4. The process according to claim 1, wherein the photoinitiator includes one of benzoyl peroxide, lauroyl peroxide, azobisisobutyronitrile, 2,2'-azobis-(2,4-dimethylvaleronitrile), diisopropyl peroxydicarbonate, and dicyclohexyl peroxydicarbonate, or any combination thereof.

5. A liquid display panel comprising:
    a color filter substrate;
    an array substrate; and
    a liquid crystal and a network of high molecular polymers filled between the color filter substrate and the array substrate,
    wherein the network of high molecular polymers is generated by polymerization of a liquid crystalline polymerizable monomer and a polymerizable siloxane coated onto the color filter substrate or the array substrate under effect of a photoinitiator with UV irradiation, and anchors liquid crystal molecules in the liquid crystal to a state of vertical orientation;
    wherein a mass of the liquid crystalline polymerizable monomer accounts for 1%~20% of the total mass of the mixture of the liquid crystalline polymerizable monomer, the photoinitiator and the liquid crystal; a mass of the photoinitiator accounts for 1%~5% of the total mass of the mixture of the liquid crystalline polymerizable monomer, the photoinitiator and the liquid crystal; and a mass of the liquid crystal accounts for 75%~98% of the total mass of the mixture of the liquid crystalline polymerizable monomer, the photoinitiator and the liquid crystal; and
    the liquid crystalline polymerizable monomer is C6M or C6M derivatives.

* * * * *